No. 785,625. PATENTED MAR. 21, 1905.
C. H. MAXSTED.
LOOM FOR WEAVING NARROW FABRICS.
APPLICATION FILED JAN. 28, 1904.
13 SHEETS—SHEET 1.

FIG. 1.

No. 785,625. PATENTED MAR. 21, 1905.
C. H. MAXSTED.
LOOM FOR WEAVING NARROW FABRICS.
APPLICATION FILED JAN. 28, 1904.

No. 785,625. PATENTED MAR. 21, 1905.
C. H. MAXSTED.
LOOM FOR WEAVING NARROW FABRICS.
APPLICATION FILED JAN. 28, 1904.

Witnesses
Wm. Kuehne
John A. Percival

Inventor
Charles Maxsted
By his Attys

No. 785,625. PATENTED MAR. 21, 1905.
C. H. MAXSTED.
LOOM FOR WEAVING NARROW FABRICS.
APPLICATION FILED JAN. 28, 1904.

Witnesses
Wm Kuehne
John A. Percival

Inventor
Charles H. Maxsted
By his Attys Richardson

No. 785,625. PATENTED MAR. 21, 1905.
C. H. MAXSTED.
LOOM FOR WEAVING NARROW FABRICS.
APPLICATION FILED JAN. 28, 1904.

No. 785,625. PATENTED MAR. 21, 1905.
C. H. MAXSTED.
LOOM FOR WEAVING NARROW FABRICS.
APPLICATION FILED JAN. 28, 1904.

No. 785,625. PATENTED MAR. 21, 1905.
C. H. MAXSTED.
LOOM FOR WEAVING NARROW FABRICS.
APPLICATION FILED JAN. 28, 1904.

No. 785,625. PATENTED MAR. 21, 1905.
C. H. MAXSTED.
LOOM FOR WEAVING NARROW FABRICS.
APPLICATION FILED JAN. 28, 1904.

No. 785,625. PATENTED MAR. 21, 1905.
C. H. MAXSTED.
LOOM FOR WEAVING NARROW FABRICS.
APPLICATION FILED JAN. 28, 1904.

FIG. 33.$\frac{a}{1}$

Witnesses
Inventor
Charles Huggins Maxsted
By his atty

No. 785,625. Patented March 21, 1905.

UNITED STATES PATENT OFFICE.

CHARLES HIGGIN MAXSTED, OF OAKLAND, WINDERMERE, ENGLAND.

LOOM FOR WEAVING NARROW FABRICS.

SPECIFICATION forming part of Letters Patent No. 785,625, dated March 21, 1905.

Application filed January 28, 1904. Serial No. 191,041.

*To all whom it may concern:*

Be it known that I, CHARLES HIGGIN MAXSTED, gentleman, a subject of the King of Great Britain and Ireland, residing at Oakland, Windermere, in the county of Westmoreland, England, have invented a certain new and useful Improved Loom for Weaving Tapes, Ribbons, and Small Wares Generally, (for which I have made an application in Great Britain, No. 6,454, dated the 20th day of March, 1903,) of which the following is a specification.

This invention relates to an improved loom for weaving tapes, ribbons, and similar small wares.

The accompanying sheets of drawings, to which I will refer during the course of the following description, clearly illustrate my invention.

Fig. 14 is a front elevation of the lower shuttle-boxes on a smaller scale than Figs. 11 and 13. Fig. 15 is a sectional plan on the line 9, Fig. 14. Fig. 15$^a$ is a plan view of a lower shuttle-box. Fig. 15$^b$ shows in face view the method of adjusting in height the shoulders upon which the shuttle falls. Fig. 15$^c$ is a view at right angles to Fig. 15$^b$. Fig. 16 is an enlarged front elevation of the harness, broken in length for want of space, and the pulleys for actuating same. Fig. 17 is a plan view of same; Fig. 18, an end view; Fig. 19, a detailed plan view, on an enlarged scale, showing the method of securing the tapes of the harness. Fig. 20 is a plan view of a portion of one of the tapes of the harness. Fig. 20$^a$ indicates a modified method of actuating the harness. Fig. 33$^a$ shows in side view, on an enlarged scale, the construction of the yokes, by means of which the pickers are rendered inoperative.

The essential feature of a loom for weaving tapes, ribbons, and similar small wares constructed in accordance with my invention consists in the provision of vertically-actuated shuttles, which are arranged to insert a pick of weft both on their upward and downward traverse. Each pick of weft after it is inserted in the shed is "beaten up" and the shed is changed for a reverse movement of the shuttle. The two-and-fro vertical movement of the shuttle, the double action of the harness or healds to change the shed, and the double beat-up of the reed are all effected during one revolution of the cam-shaft, from which the motions are obtained. Thus for one revolution of the cam or driving shaft the shed is changed twice and a pick inserted in each of the two sheds and beaten up by the reed. This being the broad principle of my improved loom, I will describe my method of carrying the same into effect, although it must be understood that I do not confine myself to such method, so far as it may be varied in point of detail.

Figure 4:
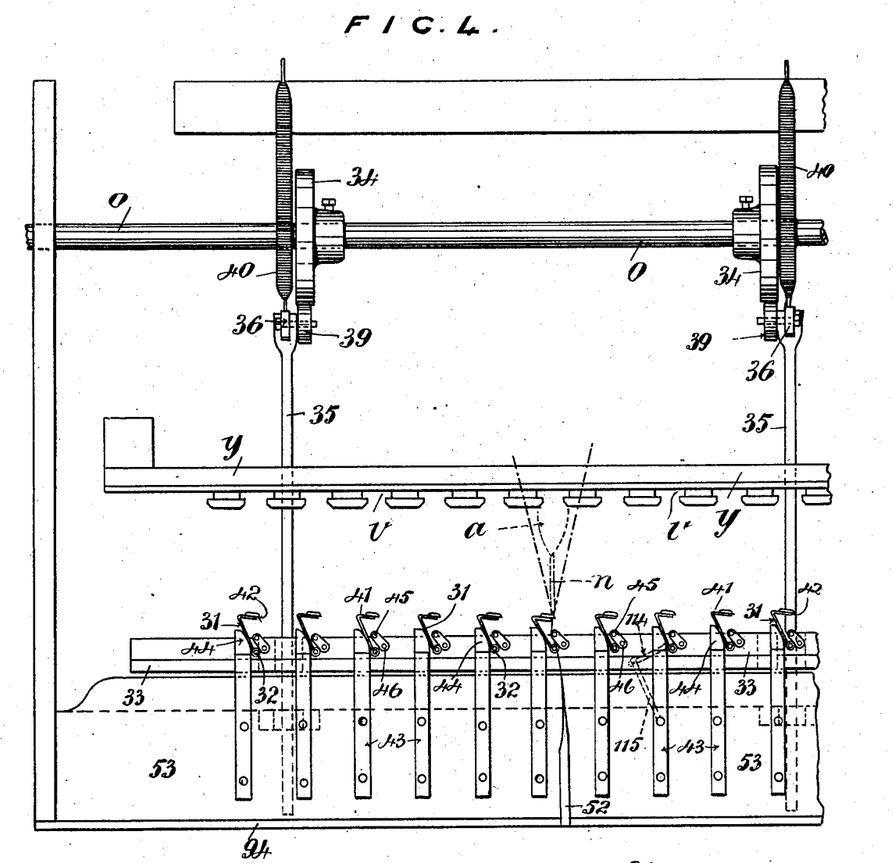
Fig. 4 is a plan view with some of the parts removed to more clearly show the beating-up mechanism.
Figure 5:
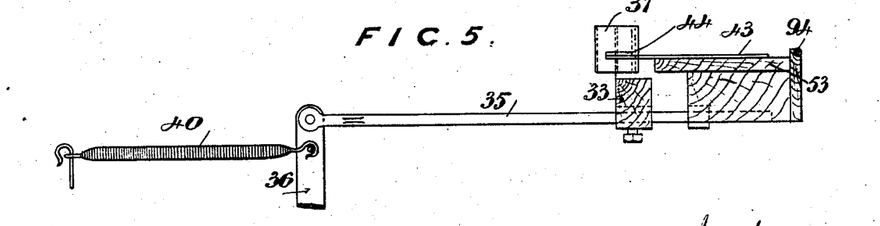
Fig. 5 is a detail view of part of the beating-up mechanism.
Figures 6, 7, 8, 9:
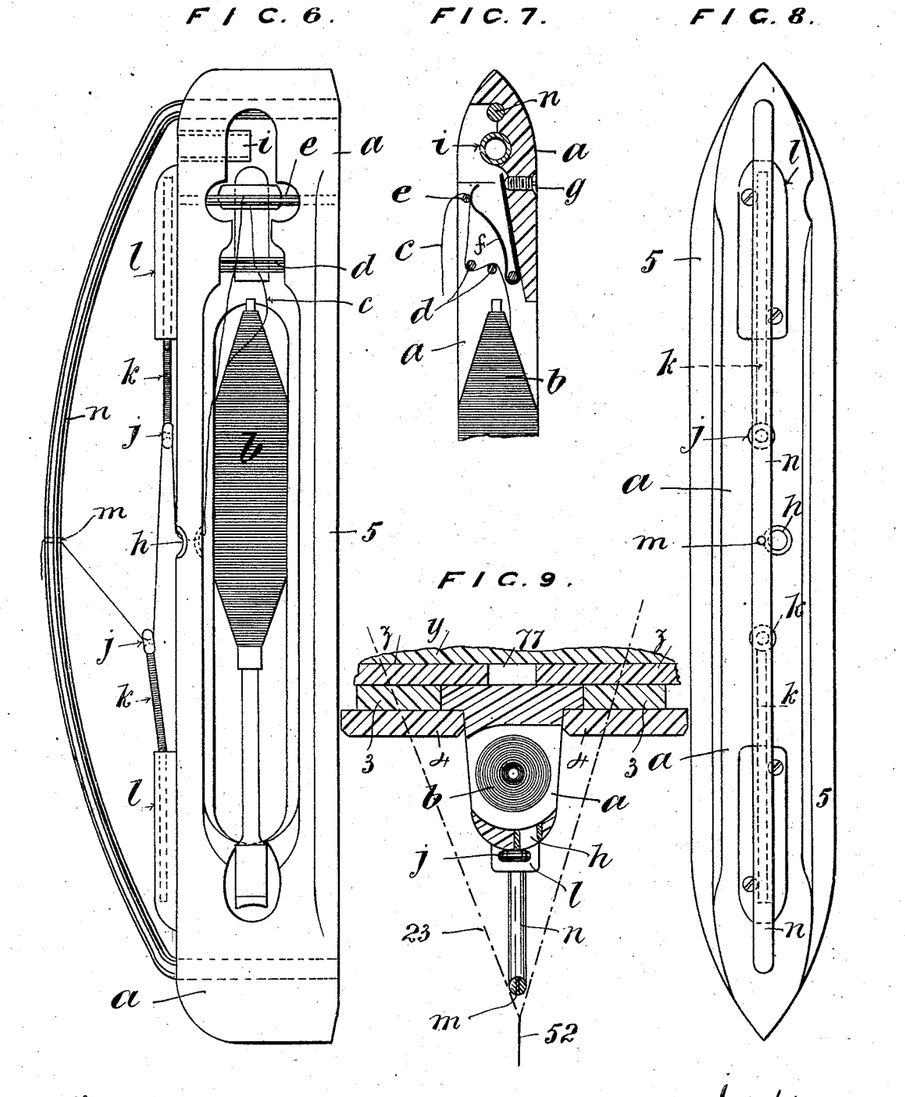
Fig. 6 is a side view of the shuttle employed in my improved loom drawn to a scale of nearly full size.
Fig. 7 is a cross-section of part of the shuttle to show more clearly the tension device.
Fig. 8 is a face view of the shuttle.
Fig. 9 is a sectional plan of the shuttle and shuttle-box.

My improved loom is provided with a number of shuttles, as is usual when weaving tapes and small wares; but instead of the comparatively diminutive shuttles previously used, which carry small spools of weft, I employ large shuttles $a$, as shown particularly in Figs. 6 to 9, having weft-cops $b$ skewered therein, somewhat similar in size to the fly-shuttles employed in looms weaving broad piece goods. The shuttle which I am at present using is about twelve inches in length, although the size may be varied to some extent, so long as it is capable of carrying a cop or bobbin of weft. The requisite tension is placed upon the weft $c$ by threading it around pillars $d$ $d$ and under a pillar $e$, against which bears a spring-plate $f$ in the head of the shuttle, the pressure of the spring-plate being regulated by a screw $g$. It is then led through a pot-eye, which may be either located and constructed as shown at $h$, as shown in Fig. 6, or as an alternative through the pot-eye $i$ to the eyes $j$ $j$, carried by delicate spiral springs $k$ $k$, slidable in housings $l$ $l$, secured to or formed in the shuttle $a$, and from thence it is threaded through a hole $m$ in the center of a wire bow $n$. The springs $k$ $k$ serve to yield and take off the strain on the thread at the end of the shuttle-stroke and also to take up slack weft. The wire bow $n$ enables me to insert the pick of weft close up to the fell of the fabric, as will be seen in Figs. 4 and 9, and reduces the distance which the reed must travel to beat up, so that a high speed of the loom can be attained.

For a general comprehension of the construction and operation of my improved loom I refer the reader to Figs. 1 to 4, the essential parts being separately shown in the remaining figures.

A cam or driving shaft $o$ is provided with suitable bearings in the end frames $p$, which frames are suitably stayed together by crosspieces to provide a rigid framework.

Mounted to slide in guides $q$ near the front of the loom is a cross-bar $r$, (see Fig. 2,) carrying a number of pickers $s$. These pickers pass through yokes $t$, carried by and slidable in a fixed cross-bar $u$, the function of which yokes will be alluded to later in the following description.

The loom is provided with a series of upper and lower shuttle-boxes $v$ $w$, respectively. Within the lower shuttle-boxes are arranged vertically-actuating pushers or pickers 11.

Figure 11:
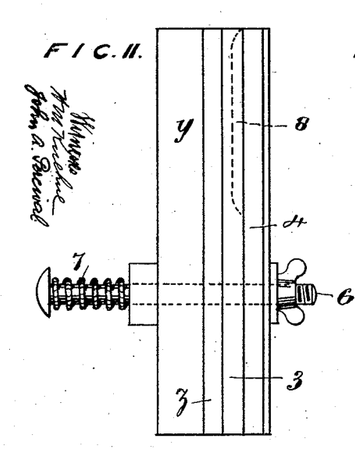
Fig. 11 is a side view, on an enlarged scale, of the upper shuttle-boxes of the loom.
Figure 12:
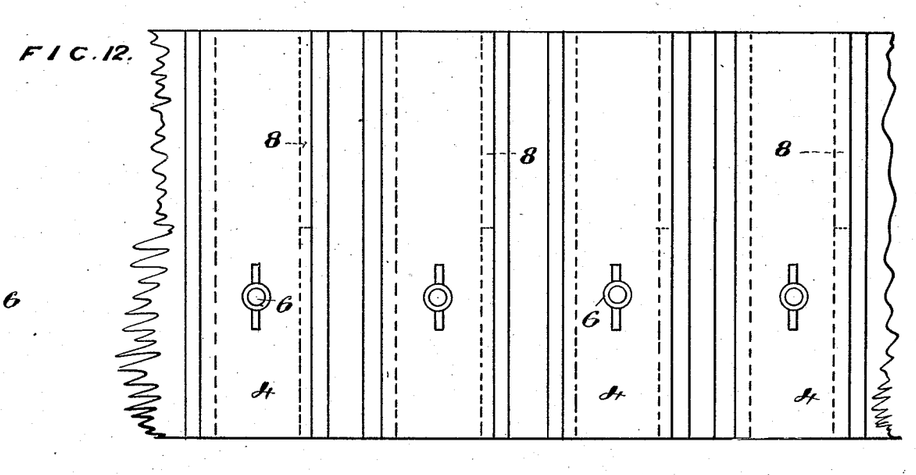
Fig. 12 is a view at right angles to Fig. 11.
Figure 13:
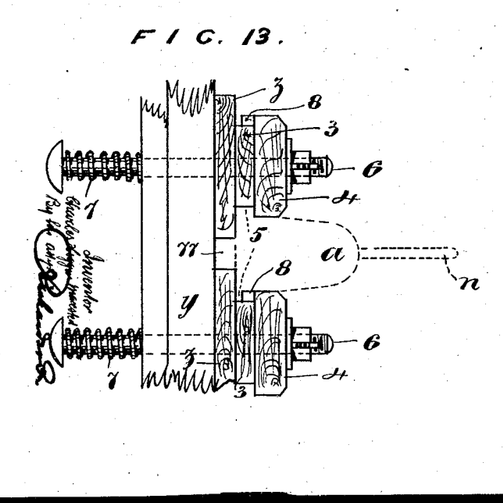
Fig. 13 is a plan view of Fig. 11.

For the construction of the upper series of shuttle-boxes $v$ the reader is referred to Figs. 11 to 13. The boxes are arranged to be carried by a back board $y$, and at intervals along this board are placed vertical pieces $z$, having spaces between them. Additional vertical pieces 3 and 4 are also provided, the pieces 3 serving to leave a space for flanges 5, formed on the shuttle $a$. The parts forming the shuttle-boxes are secured together by bolts 6, the front boards 4 being capable of yielding to receive and retain the shuttle in the box by the compression of springs 7. I also form the intermediate pieces 3 with a swell 8 at one side to help to retain the shuttles in the boxes. The shuttle is retained in the upper boxes by the jamming or wedging effect produced by the swell 8 acting against the side of the flange 5 and the spring-pressed boards 4 bearing against the front faces of the flanges. This brings sufficient pressure to bear against the shuttle to retain it in the upper box until it is ejected therefrom by the picker on its descent. The lower shuttle-boxes $w$ are shown in elevation in Fig. 14 and in sectional detail on the line 9 in Fig. 15. The upper parts of the boxes $w$ are constructed of such shape in cross-section as will receive and readily allow the shuttle $a$ to slide therein, as shown in Fig. $15^a$. The shuttle comes to rest upon shoulders 10, formed of leather or the like, which are adjustable in height to regulate the extent of fall of the shuttle. The method of securing the adjustment in height of the shoulders 10 is shown in Figs. $15^b$ and $15^c$. The shoulders 10 are arranged in recesses formed below the shuttle-boxes $w$ and are jammed in position on the bar 116 by washers 117. By slackening these washers and regulating the length of supporting-screws 118 the height of the shoulders 10 may be varied within certain limits.

Figures 14, 15, 15A:
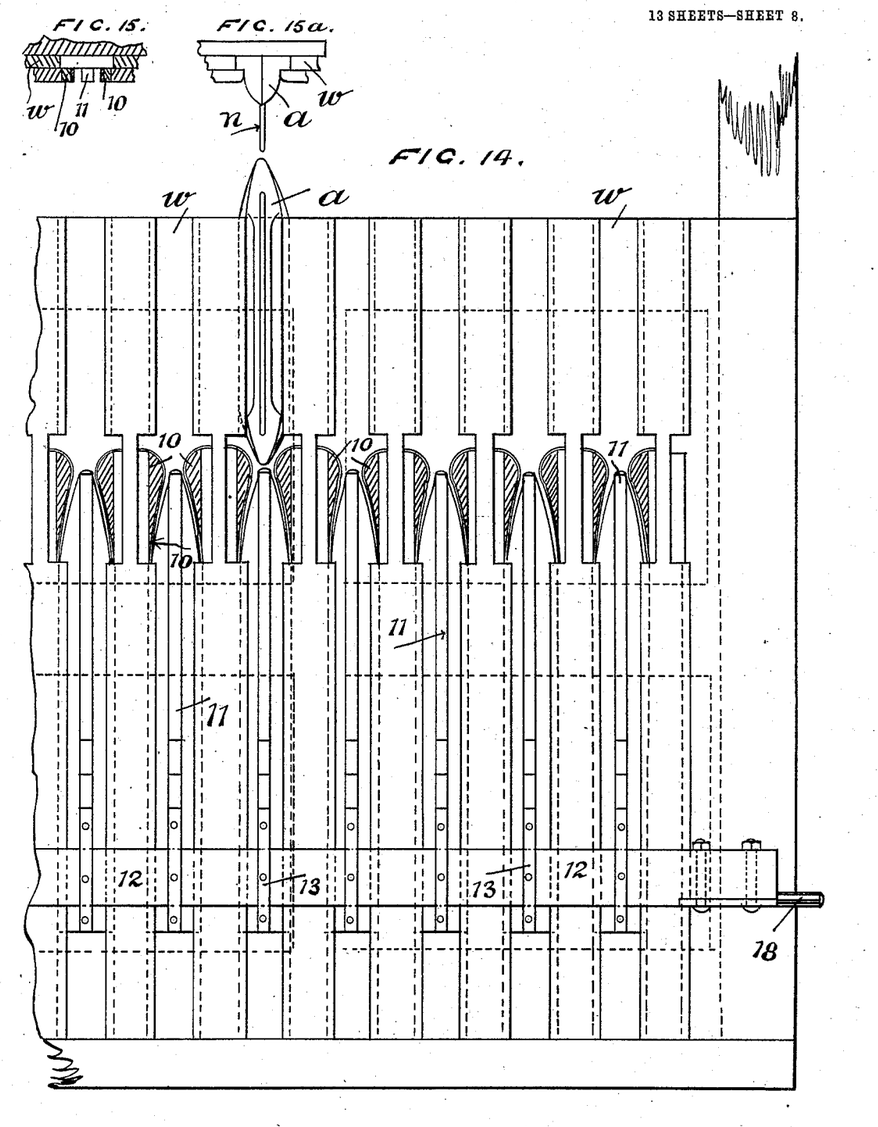

In the lower part of the shuttle-boxes $w$ are housed the slidable pickers 11, one of these pickers being shown in Fig. 14 in contact with a shuttle in readiness to thrust it out of the shuttle-box $w$ through the open shed into the upper shuttle-box $v$. The whole of these bottom pickers 11 are secured to a cross-bar 12 by means of projecting webs 13. The upper and lower pickers $s$ 11 are actuated vertically through the medium of two levers 14, each of which is mounted on a fulcrum 15 at each end of the loom. Pivoted to the levers 14 are links or rods 16, connected to the slidable cross-bar $r$, carrying the upper pickers and links 17, connected to the lever 14 and which are also connected at their lower ends to pivots 18, carried by the cross-bar 12, which actuates the lower pickers 11. As the levers 14 are vibrated it will be seen that they will effect the vertical vibration of the upper and lower pickets. To obtain this vibration of the levers 14, I provide the cam or driving shaft $o$ with two eccentrics 19, each of which is arranged in contact with the lower part of a frame or bow 20, carried by the levers 14. Thus as the eccentrics 19 revolve the levers 14 are vibrated in a downward direction and are raised by means of a load 21 on the end of the levers. The lift of the levers 14 is also affected by means of a lever A, pivoted at B and connected by means of a strap C to the bar $r$, carrying the upper pickers $s$. The end D of the lever is loaded and attached to a spiral spring E to assist the lift of the lever.

I arrange to provide a dwell of the shuttle in both the upper and lower boxes in order to allow ample time for the changing of the shed. This is effected by continuing to raise the upper pickers $s$ to some extent after the shuttle has come to rest in the upper box and by lowering the bottom pickers a slight distance below the stops 10 upon which the shuttles rest. The eye $m$ of the shuttle in the wire bow $n$ is raised and lowered an equal distance above and below the fell of the tape being woven. For one revolution of the driving-shaft $o$ the shuttles are raised and lowered, inserting two picks of weft as will be understood.

Figure 1:
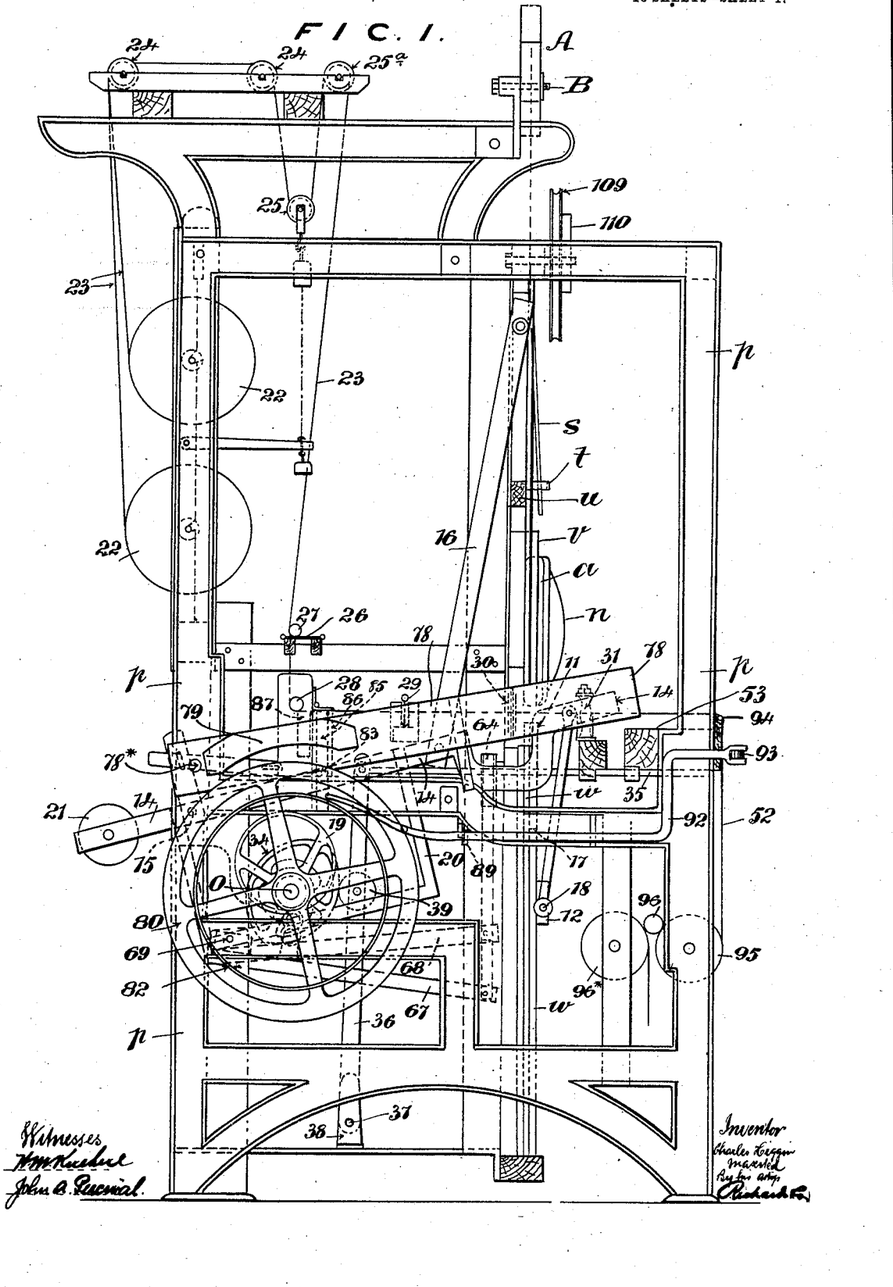
Figure 1 of such drawings represents an end view of my improved loom.
Figure 2:
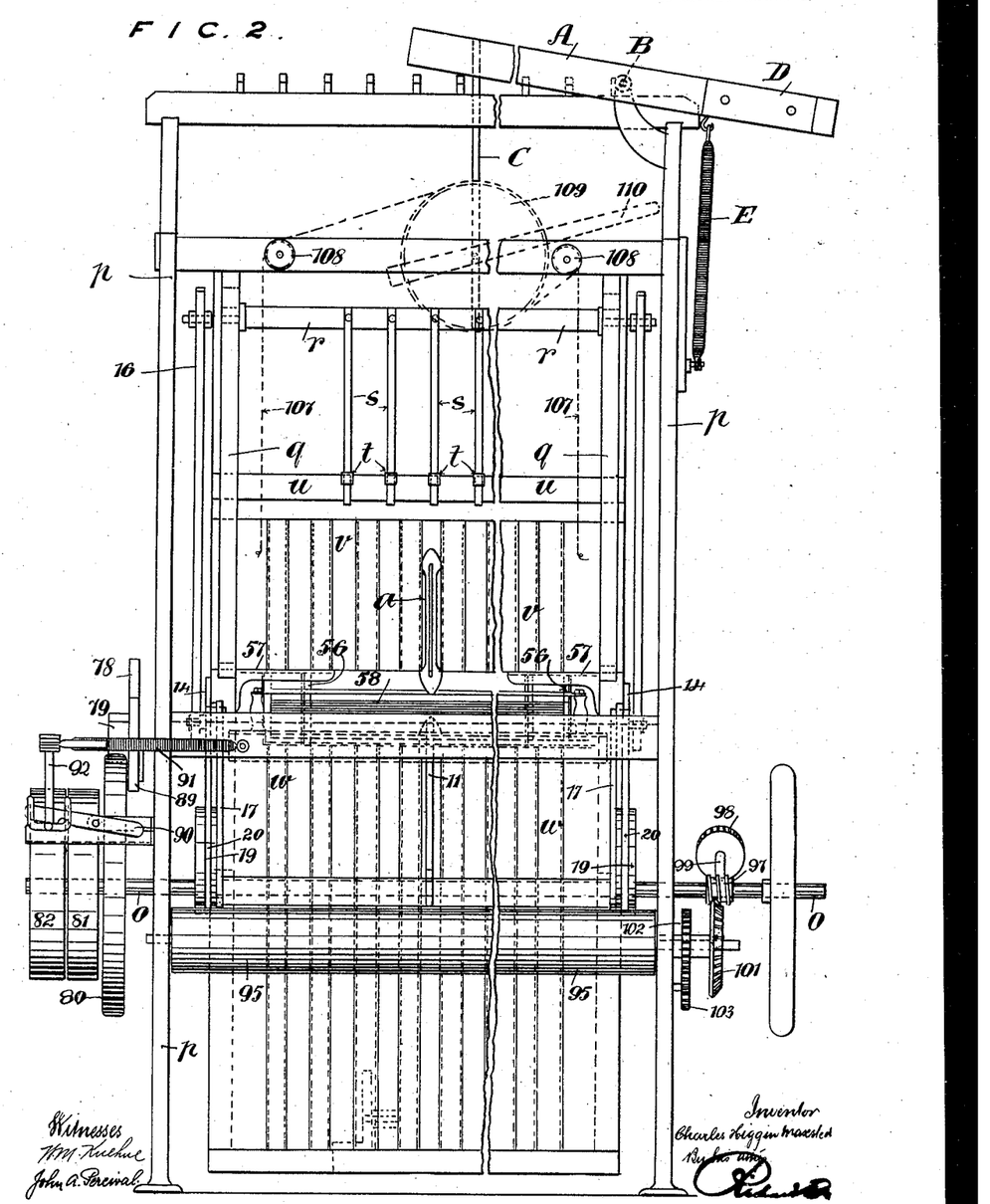
Fig. 2 is a front view.

A convenient method of carrying the warps is to have the required number of warp-threads for the particular width of tape or the like being woven wound in "ball" form 22 and carried in bearings in the frame of the loom, as shown in Fig. 1. The warp-threads 23 are led over rollers 24 24, under a weighted roller 25, over a roller $25^a$, through a reed 26, and in contact with a bar of wax 27, although the waxing is not essential. The warp-threads are then conducted under a bar 28 through a reed 29 to the harness or healds 30. The reeds 29 serve to space and retain the warp-threads in case of breakage and facilitate the piecing of broken threads. It will be understood that as the direction of the weft is vertical the warp-threads 22 are also arranged vertically in the harness to correspond. When the shuttle has passed through the shed, the reed 31 beats up the pick.

Figure 10:
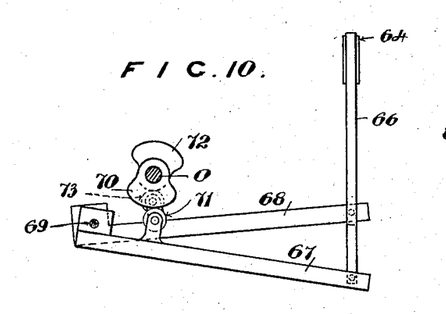
Fig. 10, Sheet 10, is a detail side view showing the treadle mechanism for operating the harness.
Figures 15B, 15C, 16, 17, 18, 19, 20:
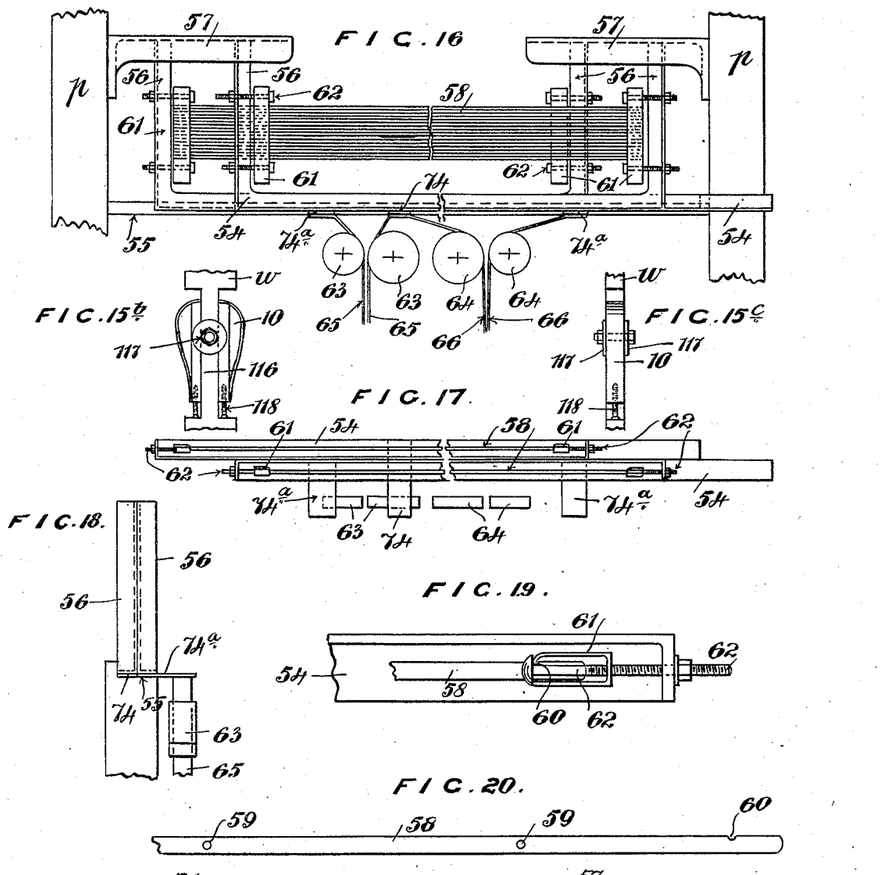
Figure 20A:
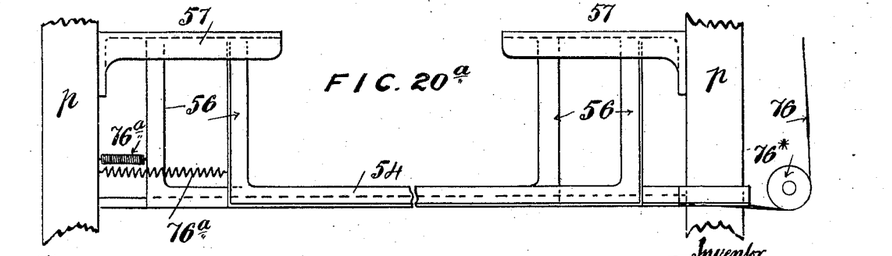
Figures 21, 22, 23, 24, 25, 26:
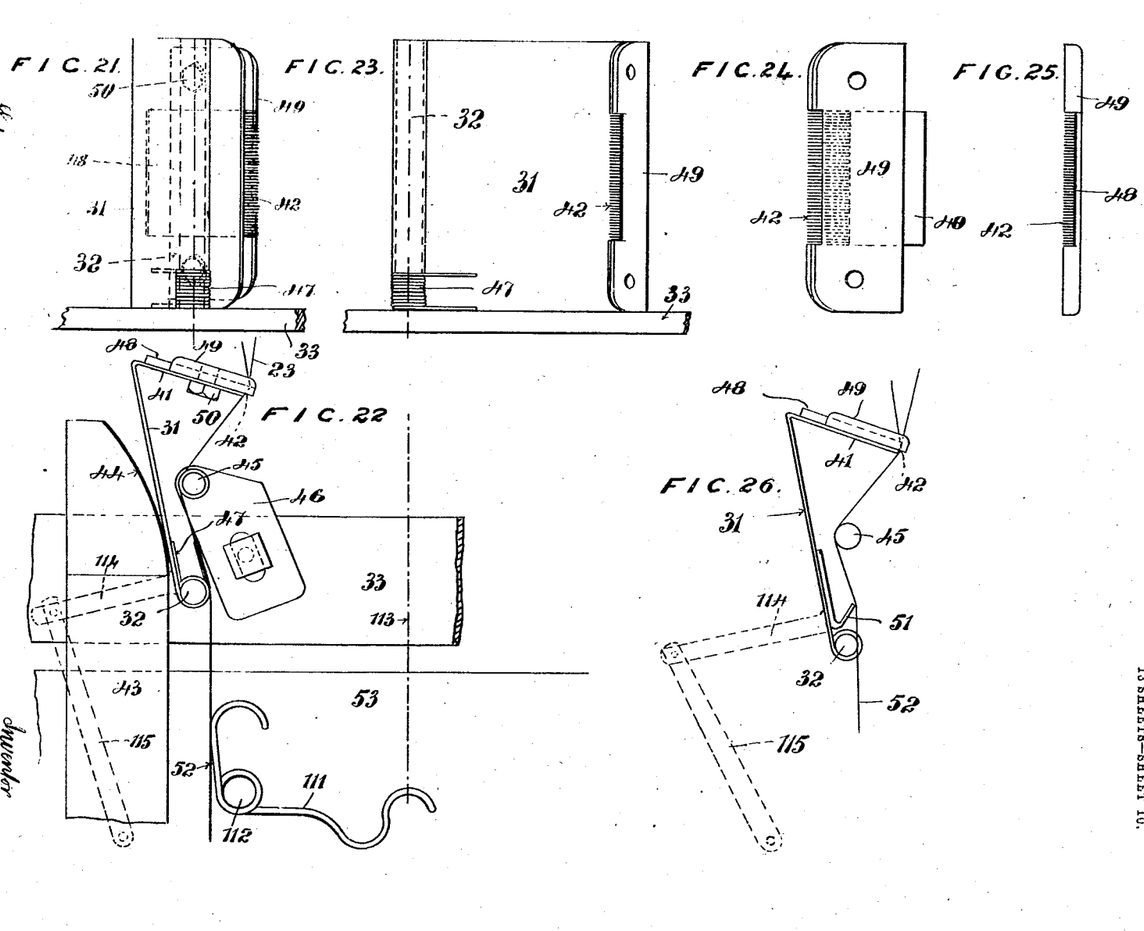
Fig. 21 shows an end elevation, about full size, of one of the reeds of combs used to beat up an inserted pick.
Fig. 22 is a plan view of the same with the cam-stop used to effect the vibration of the reed.
Fig. 23 is a view of the reed at right angles to Fig. 21.
Fig. 24 is a face view of the plate to which the comb is secured.
Fig. 25 is an edge view of Fig. 24.
Fig. 26 shows another method whereby the reed can be vibrated away from the warps after beating up and the shed is being changed.
Figure 27:
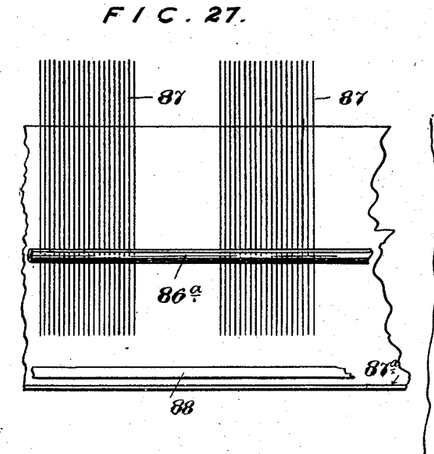
Fig. 27 shows in elevation, on a scale of about full size, a part of the means for effecting the stoppage of the loom on the breakage of a warp or weft thread.
Figure 28:
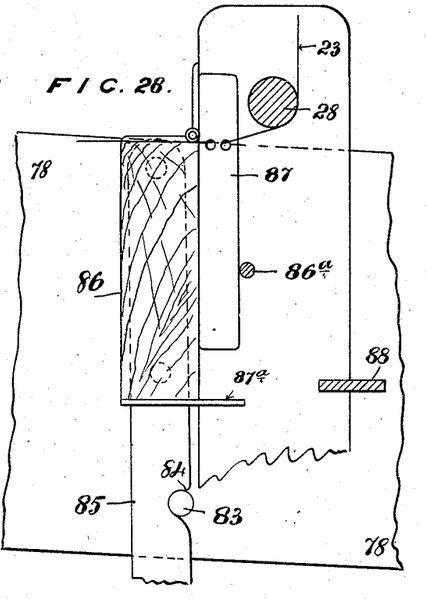
Fig. 28 is a side elevation thereof.
Figure 29:
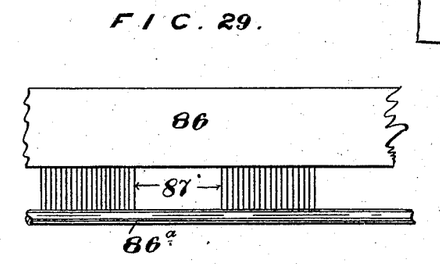
Fig. 29 is a plan of Fig. 27.
Figures 33, 34, 35:
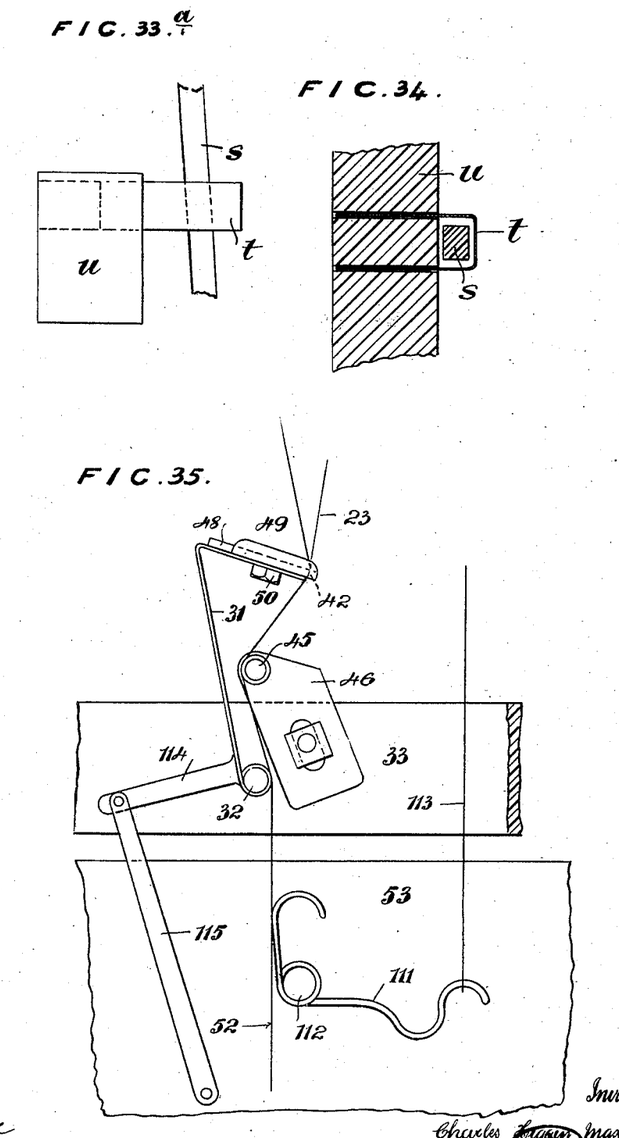
Fig. 34 is a sectional plan thereof.
Fig. 35 shows in plan view, on a scale of about full size, a modified method of vibrating the reed or comb used to beat up the pick of weft.

The reed for each tape being woven is shown to a scale of about full size in Figs. 21 to 25 and consists of a plate 31, mounted vertically on a fulcrum 32, carried by a bar 33, which is traversed toward and from the front of the loom by an arrangement shown in end elevation in Fig. 1. On the main driving or cam shaft $o$ of the loom are mounted two elliptical or oval-shaped cams 34. (Shown in plan view in Fig. 4.) Connected to the slidable bar 33, which carries the reeds, are rods 35, mounted to slide horizontally in suitable bearings. These rods are connected to rocking levers 36, pivoted at 37 to brackets 38, and a bowl 39, carried by the levers 36, is kept constantly in contact with the elliptical cams by a spring 40. Thus the points of the elliptical cams 34 traverse the reed-bar 33 twice toward the front of the loom for each revolution of the driving-shaft $o$, the springs 40 providing the two reverse motions when the points of the cams recede from the bowls 39, thus securing the requisite double beat up for one revolution of the driving-shaft. The plate 31 is formed at its free end with an angle-piece 41, carrying a comb 42, the teeth of which can be adjusted as to depth. To effect the beat up, the plate 31 is reciprocated by the bar 33 in contact with a fixed stop 43, formed with a cam-surface 44, the comb end of the plate being thus vibrated through a short arc, as will be apparent from an inspection of Figs. 4 and 22. The comb thus engages with the warp-threads 23 as it is traversed toward the front of the loom and beats up the inserted pick. At the same time to take up any slack in the warp-threads the comb 42 deflects the tape partly around a vertical pillar 45, which puts the requisite tension on the threads. The position of the plate 46, carrying the pillar 45, is adjustable on the reciprocating bar 33. One-half of the shed is always or nearly always in contact with the comb 42, and as the shed is changed the comb is returned to its initial starting-point by the tension of the woven tape, or, as shown in Figs. 21 to 23, this return movement is assisted by a spring 47. Fig. 21 is an end elevation of the reed; Fig. 22, a plan, and Fig. 23 a view, of Fig. 21 at a right angle. The teeth of the comb are cut in a plate 48, which is secured to the angle-piece 41 by means of a covering-plate 49 and screws 50. The covering-plate 49 and comb 42 are shown separately in face view at Fig. 24 and in edge view in Fig. 25. To enable the tension of the woven tape to effect the return movement of the reed when the shed is opened for the passage of the shuttle, I may provide the plate 31 with a projecting angle-piece 51, as indicated in Fig. 26, so that the tendency of the woven tape 52, bearing against this projection, will thrust the plate 31 away from the warps when the reciprocating bar 33 is moved inward toward the shuttle-boxes. The stops 43 are adjustably secured upon a fixed breast-piece 53 at the front of the loom. By adjustment of these stops the amount of arc through which the reeds are vibrated can be varied. As a modification I may vibrate the comb-plate 31 more positively by forming a finger or lever 114 at the back of the plate 31 and connecting this lever 114 with a link 115, pivoted on the breastplate 53, as shown in Fig. 35. The stops 43 would thus be dispensed with. When the inserted pick has been beaten up, the harness or healds are actuated to change the shed, and assuming the shuttles are in the upper box they are forced thereout by the upper pickers into the lower boxes and when released from the pressure of the upper boxes the shuttles drop by gravity into the lower boxes, inserting another pick of weft, which is again beaten up by the reeds. The shed is again changed and the shuttles are raised by the lower pickers through the open shed into the upper boxes to insert pick of weft which is beaten up by the reeds as before, and so on. The healds or harness is shown on an enlarged scale in Figs. 16 to 18. The harness consists of horizontal bars 54, slidable on a bed 55, provided in the frame of the loom and having turned-up ends 56, which are supported and guided in suitable bearings 57. The bed 55 is simply a ledge or flat surface formed in the frame of the loom. For a loom weaving plain tape two of these healds would be sufficient, but for fancy ribbons or tapes any desired number may be used. The slidable bars 54 each carry a number of flat tapes or round wires or cords 58, arranged vertically and provided with eyes 59 for the warp-threads, the number of eyes on each wire corresponding to the maximum number of tapes or pieces being woven in the loom. A portion of one of these harness-wires is shown in plan view in Fig. 20. The required number of harness wires or tapes 58 are secured to the bars 54 as follows: A slot 60 is formed at each end of the tapes 58, within which fits the hooked end of a bracket 61, as shown in enlarged plan view, Fig. 19. Separating-pieces are preferably placed at each end of the harness-tapes and when the whole have been placed in position the brackets 61 are screwed up toward the ends of the bars 54 by means of the screws 62, so as to put the requisite tension on the harness-tapes. To actuate the healds horizontally, and thus obtain the requisite shedding motion, I provide two pair of pulleys 63 64, mounted to revolve on studs carried by the frame of the loom. Two pairs of cords or bands 65 66 pass partly around the pulleys 63 64, one pair being connected to a treadle-lever 67, the other pair to an oppositely-acting treadle-lever 68. The treadle-levers are shown in side elevation in Fig. 1 pivoted at 69 and are separately shown in Fig. 10, Sheet 10. On the driving-shaft $o$ are mounted two oppositely-arranged cams, one, 70, acting on a bowl 71, carried by the treadle-lever 67, the other, 72, similarly in contact with a bowl 73, carried by the other treadle-lever, 68. To reciprocate the healds, a bracket 74 is secured to the back harness-bar 54, the front harness-bar having secured to it two of such brackets $74^a$. The inner straps 65 66 are both connected to the bracket 74 on the back harness-bar, and the other outer straps 65 66 are secured one to each of the two brackets $74^a$ on the front harness-bar. In Fig. 16, which is a front elevation of the harness, the straps 65 have been actuated by depression of the treadle to which they are secured, which has had the effect of reciprocating the two healds to which they are connected in opposite directions to open the shed. This has been effected by one half-revolution of the driving-shaft $o$. During the other half-revolution of the shaft $o$ the treadle to which the bands 66 are attached is lowered, bringing about a reverse movement of the harness, so that the shed is changed twice during one single revolution of the driving-shaft $o$. Fig. 16 shows one pair of healds only, Fig. 17 being a plan view and Fig. 18 an end view. For fancy ribbons or tapes more than one pair would be used. When more than two healds are used, working in conjunction with a dobby or cams, the treadle-and-strap motion may be dispensed with and the harness be reciprocated as desired by means of cords 76, leading to the dobby or cams, the cords 76 being guided around pulleys $76^*$ to obtain a horizontal pull, as shown applied at one side in Fig. $20^a$. Springs $76^a$ may also be used to effect the return movement.

Figure 30:
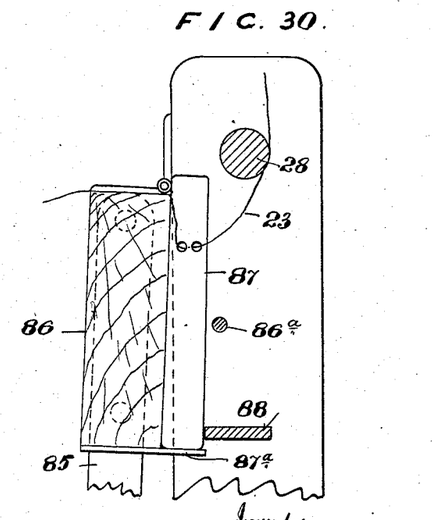
Fig. 30 indicates the position of the parts in Fig. 28 on the breakage of the thread.
Figures 31, 33:
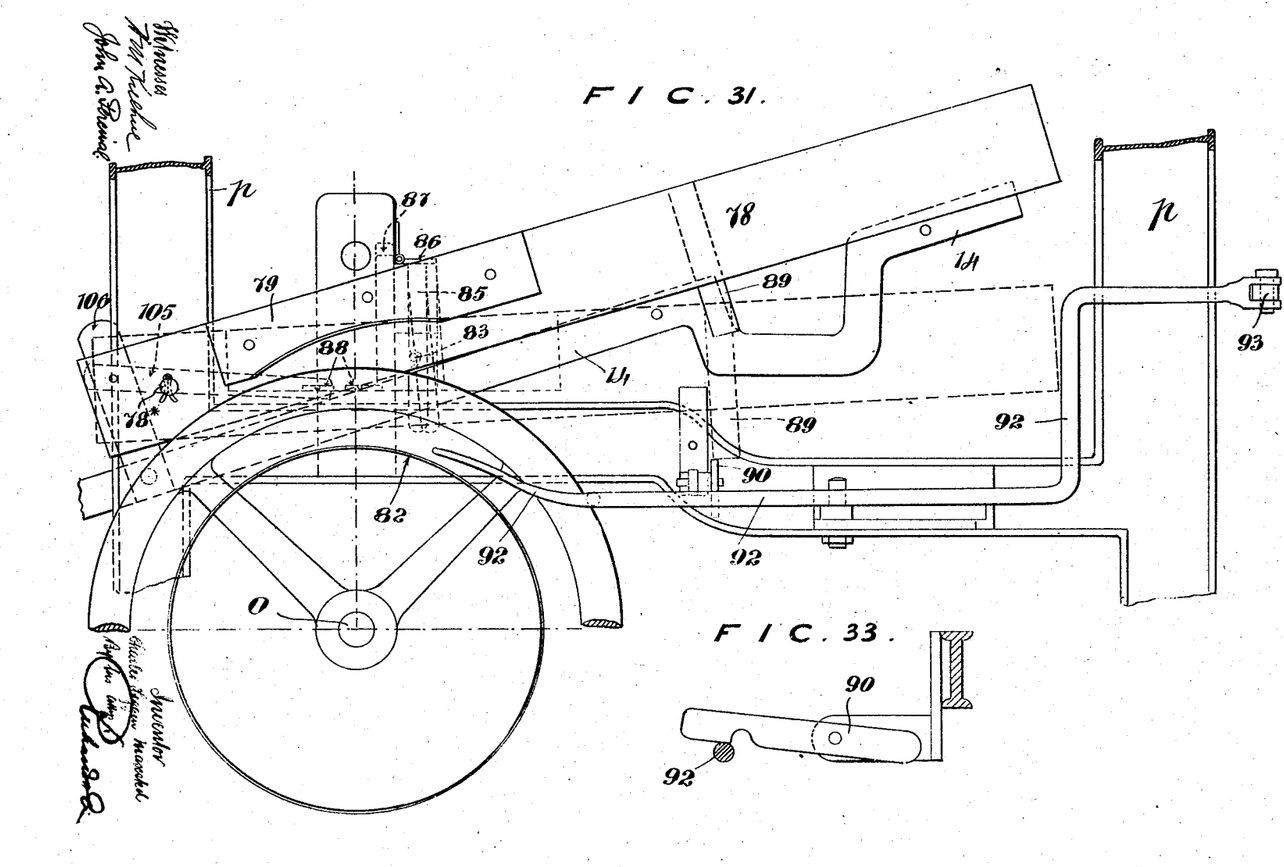
Fig. 31 shows in front elevation a part of the mechanism used to stop the loom on breakage of a warp or weft thread, the feeler 88 being shown in two positions.
Fig. 33 is a detail part of such mechanism.
Figure 32:
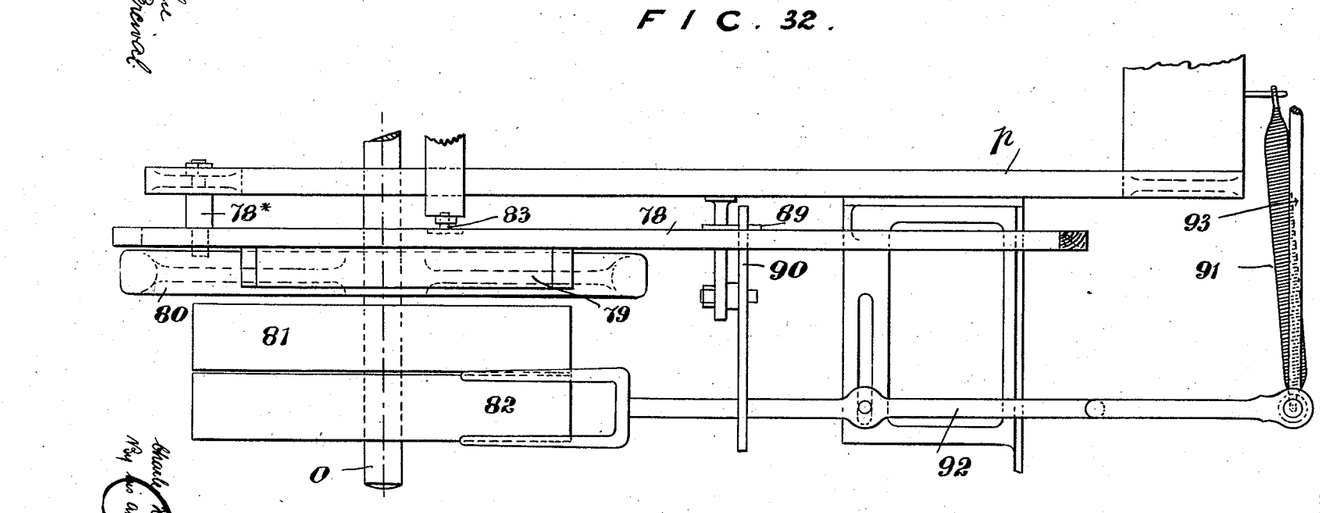
Fig. 32 is a plan thereof.

When it is desired to piece a broken weft-thread or renew an exhausted cop, I provide means to deflect the upper rod or picker $s$ so as not to come into contact with the shuttle $a$, which would then be retained in the upper shuttle-box. This deflection of any one of the pickers $s$ is effected by means of the yoke $t$, through which the picker $s$ passes. The yoke consists of a U-shaped piece of sheet metal and is capable of sliding within grooves or slots formed in the cross-bar $u$, as shown more clearly in the enlarged view in elevation in Fig. $33^a$ and in sectional plan, Fig. 34, and when pushed inward, as indicated in Fig. 34, the pickers $d$, which are flexible, are directed on each downward stroke into a channel 77 (see Figs. 9 and 13) behind the shuttle $a$, the pickers being thus for the time inoperative. The broken thread could then be pieced or the shuttle removed, so as to put in another cop without stopping the loom. I also arrange a stop-motion to stop the loom on the breakage of a warp or weft thread. A lever 78 (see Figs. 1, 28, 31, and 32) is provided, pivoted at $78^*$ on the frame of the loom to put a brake 79 on a brake pulley or wheel 80 and also remove the driving-belt from the fast pulley 81 to the loose pulley 82. This lever is normally suspended by means of a pin 83 engaging a notch 84, formed in a bar 85, secured to a hinged board 86, so as to be out of action. This is shown in Figs. 1, 28, 31, and 32. Each of the warp-threads 23 is threaded through and supports a plate or dropper 87, which falls, guided by a rod $86^a$, upon a platform $87^a$ when the thread is broken, the dropper then bridging the space between the hinged board 86, supporting the brake-lever 78 and a horizontally-reciprocated feeler or bar 88 or other moving part of the loom. The bar coming into contact with the fallen dropper causes the supporting-board 86 to be oscillated, as shown in Fig. 30, allowing the brake-lever 78 to fall and act to stop the loom. This stoppage is effected by means of the brake 79 coming into contact with the brake-wheel 80 and a detent 89, carried by the brake-lever, raising a pivoted catch 90 on the descent of the lever, a spring 91 then serving to pull the pivoted belt-shifter 92 from the fast to the loose pulley. In Fig. 32 the belt-shifter has been released and has shifted the driving-belt onto the loose pulley. Fig. 33 shows in face view the pivoted catch 90, which has been raised to release the belt-shifter. A rod 93, connected to the belt-shifter 92, passes in front of the loom, so as to facilitate the starting of the loom by hand by the operative. The feeler or reciprocated bar 88 derives its motion by means of levers 105, connected to each end of the bar 88 and pivoted to rocking arms 106, connected to the side levers 14, used to actuate the pickers. The bar 88 is provided with suitable supports or bearings, on which it slides.

In case the operative fails to attend to a shuttle on the breakage or failure of the weft means are also provided to bring the stop-motion into action. This is clearly shown in Fig. 22. The wire finger 111, pivoted loosely at 112 on the breast-piece 53, is also connected to a dropper 87 by a cord 113, which dropper is normally kept out of the path of the feeler-bar 88 by the resistance of the woven tape or ribbon 52. On the failure of the weft the warp-threads alone reaching the wire finger 111 allow the wire finger to pass between them, which brings the dropper 87 in the path of the feeler-bar 88, and so stops the loom in the manner described.

Figure 3:
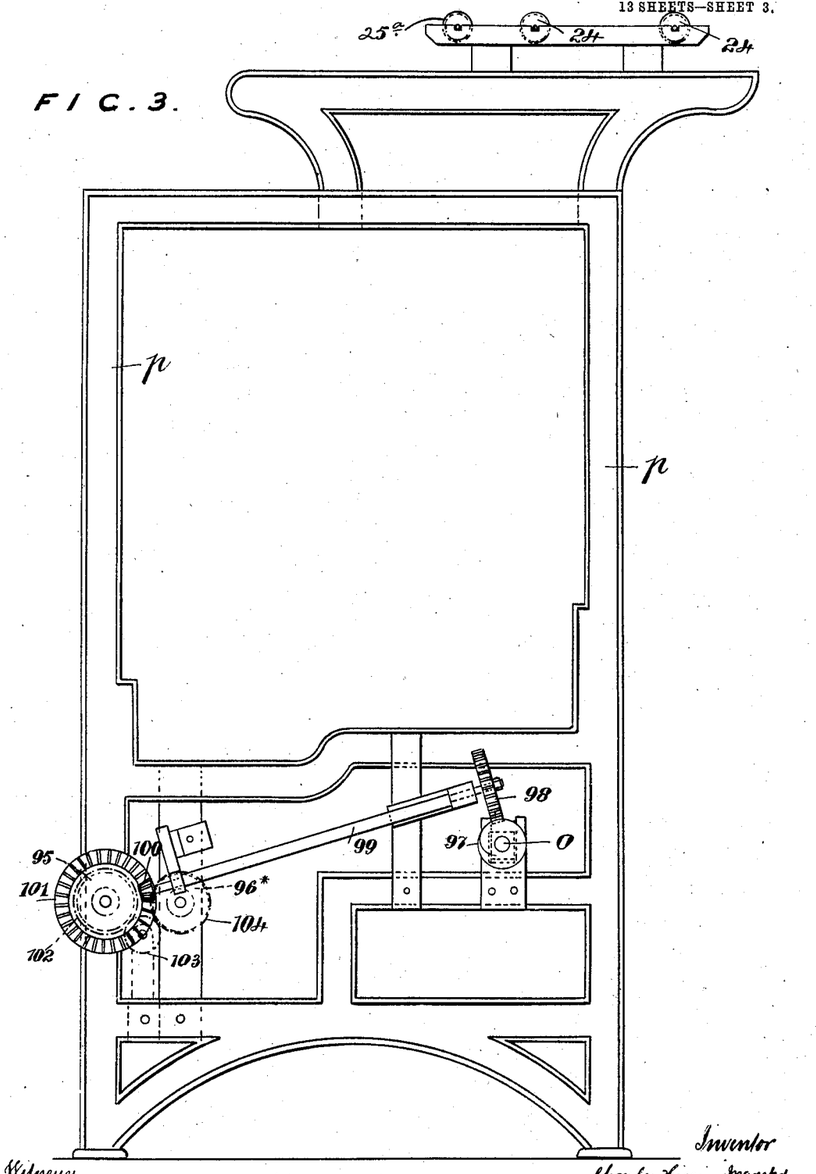
Fig. 3 is a view of the opposite end of the loom, showing the taking-down motion for the tape or ribbon.

The tapes or the like when woven are taken down by a roller actuated as usual or in any convenient manner. A method of doing this is shown in Fig. 3. As shown in Fig. 1, the tapes or ribbons when woven are conducted over a rod 94, partly around a roller 95, over another roller 96 in frictional contact with the roller 95 and a roller 96*, from which they drop into a box or other receptacle or are otherwise dealt with. To rotate these taking-down rollers 95, 96, and 96*, I provide the driving-shaft $o$ with a worm 97, gearing with a worm-wheel 98 on a shaft 99. A bevel-pinion 100 on this shaft meshes with a bevel-wheel 101, secured to the axis of the front roller 95. Also mounted on the axis of the front roller 95 is a spur-wheel 102, which by means of an intermediate or carrier pinion 103 communicates motion to a spur-wheel 104, secured upon the axis of the back roller 96*. I wish it to be understood, however, that I am aware that this taking-down motion is not novel, nor do I wish to claim it as such.

To facilitate access to the harness when piecing a broken warp-thread or for any other purpose, I arrange means (shown in Fig. 2) to enable me raise the upper shuttle-boxes $v$ when desired. These shuttle-boxes are capable of sliding in the frame of the loom, and they are connected to cords 107, which pass over guide-pulleys 108 and around a central pulley 109. This pulley 109 can be partially rotated by means of a handle 110, thus winding the cords 107 on the pulley and raising the shuttle-boxes, which can be again lowered by a reverse movement of the handle. If desired or necessary, the upper shuttle-boxes could be suitably weighted to prevent their accidental displacement by the action of thrusting the shuttles therein.

It will be understood that the loom can be made wide enough to carry any desired number of shuttles within reasonable limits.

A loom for tapes and small wares constructed in accordance with my invention has many advantages over and above looms of the existing type. With one complete revolution of the driving or cam-shaft I secure the vertical to-and-fro motion of the shuttle, inserting a pick both on the upward stroke and downward. Two picks are thus inserted during such revolution of the cam-shaft. Instead of using small spools of weft, which not only require to be especially wound, but are quickly exhausted, I employ a shuttle having the capacity of a full-sized weft-cop, thus saving considerable time previously given to winding spools and their frequent renewal. The shuttle may be changed without stopping the loom. The space occupied by the shuttle and mechanism for a given width of tape is less in width than the old type of loom, so that a greater number of pieces may be woven in a given width of loom, as no more width space is required in my loom for a three-inch tape than for one-eighth-inch tape. It is possible to weave pieces one-eighth of an inch wide to three or more inches in the loom at the same time, as all that is required is to put in warps of the required number of ends with suitable harness, the drag of the weft and the shuttles remaining the same. Thus a loom capable of weaving, say, six inches wide will weave any width from one-eighth of an inch to six inches, thereby saving cost of suitable battens to suit different widths of tape or ribbon. Owing to the short arc of movement of the beating-up reed and the absence of the usual picking mechanism less power is absorbed, and as the loom works with less shock and jar a greater speed can be easily attained. My invention can be readily applied to existing looms weaving tapes, ribbons, and small wares.

I declare that what I claim is—

1. In looms for weaving tapes, ribbons and small wares generally the vertically-actuated shuttle and fixed vertical guides for said shuttle for the purposes substantially as described.

2. In looms of the indicated nature the combination of large vertically-actuated shuttles, the harness-guides for such shuttles arranged above and below the harness and means for reciprocating the same in such guides substantially as described.

3. The combination of parts for actuating the vertically-thrown shuttles in looms for weaving tapes, ribbons and other small wares comprising the upper and lower shuttle-boxes, the series of upper and lower pickers means for actuating such pickers and means for obtaining a dwell or pause of the shuttles in their respective boxes to provide time for the changing of the shed substantially as described.

4. In a picking motion of the indicated nature, the combination with the upper and lower shuttle-boxes, and shuttles, of upper and lower pickers with means for operating them and means for deflecting the upper pickers to prevent their coming in contact with the shuttles when held in said upper box so as to enable a broken weft-thread to be pieced or the shuttle to be removed to renew the weft without stopping the loom, substantially as described.

5. In a loom of the indicated nature the reed or beating-up mechanism consisting of a pivoted angle-plate, a comb adjustably secured to such plate a bar on which such plate is pivoted means to reciprocate such bar consisting of rods connected to pivoted levers double-acting oval or elliptical cams and springs or loads to rock the levers in a forward and backward direction twice during one revolution of the cam-shaft, means for vibrating the comb-plate through an arc to beat up the inserted pick and retract it when the shed is changed and a pillar around which the tape or the like is deflected to take up slack in the warp-threads substantially as described.

6. The shedding motion consisting of horizontally-reciprocated harness having a number of vertically-arranged tapes of metal or other material formed with eyes for the warp-threads with means for reciprocating the harness horizontally, said means consisting of two treadle-levers, cams for vibrating such levers, two straps or bands secured to each treadle-lever, one of each pair of straps being connected to each harness and guide-pulleys for the straps substantially as described.

7. In combination in a loom for weaving tapes, ribbons and small ware, a driving-shaft, upper and lower pickers actuated from such shaft, vertical guides or shuttle-boxes the shuttles *a* means for raising and lowering them vertically in such guides or boxes by one revolution of the driving-shaft, the harness, and means for actuating the same, the reed for beating up and means for actuating same, means for stopping the loom on the breakage of a weft or warp thread and taking-down mechanism for the woven tape substantially as described.

8. In combination in a loom of the indicated nature, a driving-shaft, eccentrics mounted on such shaft, levers vibrated in one direction by such eccentrics during the revolution of the driving-shaft, upper and lower pickers connected to the levers, springs or loads to obtain reverse movement of the levers vertical guides or shuttle-boxes, large shuttles actuated vertically in such guides by the pickers, means for obtaining a dwell of the shuttles at the end of each stroke, and means for rendering any one of the upper pickers inoperative, and means for carrying and weighting the warps, the harness and means for actuating the same and for changing the shed twice during one revolution of the driving-shaft the reeds for beating up the inserted pick and actuating means for the same, means for stopping the loom on the breakage of a warp or weft thread, the taking-down mechanism for the woven tape and means for raising the upper shuttle-boxes or guides to afford access to the harness or to facilitate the piecing of a broken warp-thread substantially as described.

In witness whereof I have hereunto set my hand in presence of two witnesses.

CHARLES HIGGIN MAXSTED.

Witnesses:
ALFRED YATES,
JOSHUA ENTWISLE.